United States Patent [19]

Takatori et al.

[11] Patent Number: 5,189,668
[45] Date of Patent: Feb. 23, 1993

[54] ATM SWITCH AND ATM MULTIPLEXER

[75] Inventors: Masahiro Takatori, Kokubunji; Yukio Nakano, Hachioji; Yoshihiro Ashi; Tadayuki Kanno, both of Yokohama, all of Japan

[73] Assignee: Hitachi, Ltd., Tokyo, Japan

[21] Appl. No.: 741,588

[22] Filed: Aug. 7, 1991

[30] Foreign Application Priority Data

Aug. 10, 1990 [JP] Japan ................................. 2-210346
Nov. 9, 1990 [JP] Japan ................................. 2-302403

[51] Int. Cl.$^5$ .............................................. H04J 3/02
[52] U.S. Cl. ..................................... 370/60; 370/94.1; 370/56
[58] Field of Search ................... 370/94.1, 60, 91, 92, 370/56

[56] References Cited

U.S. PATENT DOCUMENTS

| | | | |
|---|---|---|---|
| 4,786,899 | 11/1988 | Berner et al. | 370/56 X |
| 4,864,558 | 9/1989 | Imagawa et al. | 370/60 |
| 4,969,149 | 11/1990 | Killat et al. | 370/60 |
| 5,046,064 | 9/1991 | Suzuki et al. | 370/94.1 |

FOREIGN PATENT DOCUMENTS 2-161851  6/1990  Japan .

Primary Examiner—Benedict V. Safourek
Assistant Examiner—Russell W. Blum
Attorney, Agent, or Firm—Antonelli, Terry, Stout & Kraus

[57] ABSTRACT

An ATM switch has a plurality of concentration space-division switches each constituted with an S-stage connection of switch modules. Each of the switch modules includes M buffers and a selector for selecting an arbitrary one of outputs from the M buffers. Each stage includes switch modules of which the number is obtained by multiplying by at most M a number of switch modules disposed in a stage succeeding thereto. The S stages include a final stage constituted with a switch module.

30 Claims, 14 Drawing Sheets

ATM SWITCH AND ATM MULTIPLEXER

BACKGROUND OF THE INVENTION

The present invention relates to an asynchronous transfer mode (ATM) transmission apparatus, an ATM exchange, and an ATM multiplexer.

In FIG. 10, a switch system includes, for each of the output high ways 125-1 to 125-L, as many buffers as there are input high ways 120-1 to 120-K. Each input highway transfers an ATM cell (to be simply called a cell herebelow) conforming to the CCITT Recommendation I.361. The cell has a header field containing a virtual path identifier (VPI).

The cell is assigned with an input highway number in an input port. At an entrance of each switch, an address filter (AF 121-1 to AF 121-K) checks the VPI assigned to a received cell and an input highway number thereof to decide whether or not the cell is delivered to an output highway associated with the address filter. Passing through the address filter, the cell enters a buffer (122-1 to 122-K) to await an output timing. A selector 123 is used to select either one of the outputs from the buffers so as to output a selected cell to an output highway. The configuration of FIG. 10 further comprises a buffer control circuit 124 and concentration space-division switches 126-1 to 126-L.

Alternatively, in the input port, the pertinent cell is assigned with an output highway number for an output thereof. At an entrance of each switch, the address filter checks the output highway number assigned to a received cell to determine whether or not the cell is delivered to an output highway to which the address filter belongs. The cell having passed the address filter is loaded in a buffer associated therewith to wait for an output timing. The selector 123 then selects either one of the outputs from the buffers so as to output a selected cell to an output highway, thereby accomplishing a cell switching operation.

An example related to the present invention has been described, for example, the JP-A-2-161851.

In the conventional technology, in order to lower the cell loss probability according to the switching method in which buffers are disposed for the respective output highways, each buffer is required to have a large capacity. Consequently, it is difficult to form, in a large-scale integrated (LSI) chip, the plural buffers 122-1 to 122-K and the buffer controllers 124 related thereto as shown in FIG. 10. To overcome this difficulty, it is necessary in an actual switch system to dispose a plurality of buffer LSI chips and separated control LSI chips controlling the buffers. This accordingly increases the number of LSI chip kinds to be developed. Moreover, although a large-capacity buffer is needed to configure a switch having a low cell loss probability, the buffer size is also restricted by the capacity of the LSI chip. This has heretofore made it difficult to implement a switch developing a low cell loss probability.

SUMMARY OF THE INVENTION

It is therefore an object of the present invention to provide an ATM switch and an ATM switch control method in which switch modules of a reduced number of kinds are employed to obtain a low cell loss probability through a simplified control operation.

According to an ATM switch of the present invention, in an ATM switch of an individual buffer type which accommodates therein K input highways (K is an integer equal to or more than one) and L output highways (L is an integer equal to or more than one) and which includes for each of the output highways a concentration space-division switch having K input highways and one output highway, the concentration space-division switch is constituted with S stages of switch modules (S is an integer equal to or more than one) each including M input highways (M is an integer equal to or more than one), M buffers, a selector for selecting an arbitrary one of outputs from the M buffers, M buffer control circuits for supervising the respective buffers, and a selector for achieving an output instruction to an arbitrary one of the M buffer control circuits and for conducting a selector control operation. In the structural relationships between switch modules connected to each other in the S stage, the number of switch modules in a stage is attained by multiplying by at most M the number of switch modules in a stage immediately subsequent thereto; moreover, the final stage includes only one switch module. In this constitution, outputs of the M switch modules in each stage are linked with inputs of the switch modules in a stage subsequent thereto. In the case where a cell loss may possibly occur because of an insufficient buffer in either one of the switch modules, a read inhibit signal is transmitted to the switch modules in a stage immediately preceding the stage of the pertinent switch module. On receiving the read inhibit signal, the switch modules are inhibited from transmitting a cell to the pertinent switch module.

Alternatively, if a cell loss has taken place due to an insufficient buffer in either one of the switch modules, a retransmission request signal is sent to the associated switch module in a stage immediately preceding the stage of the pertinent switch module. After receiving the read inhibit signal, the switch module transmits again the discarded cell to the pertinent switch module.

The foregoing and other objects, advantages, manner of operation, and novel features of the present invention will be understood from the following detailed description when read in connection with the accompanying drawings.

DESCRIPTION OF THE PREFERRED EMBODIMENTS

Figure 1:
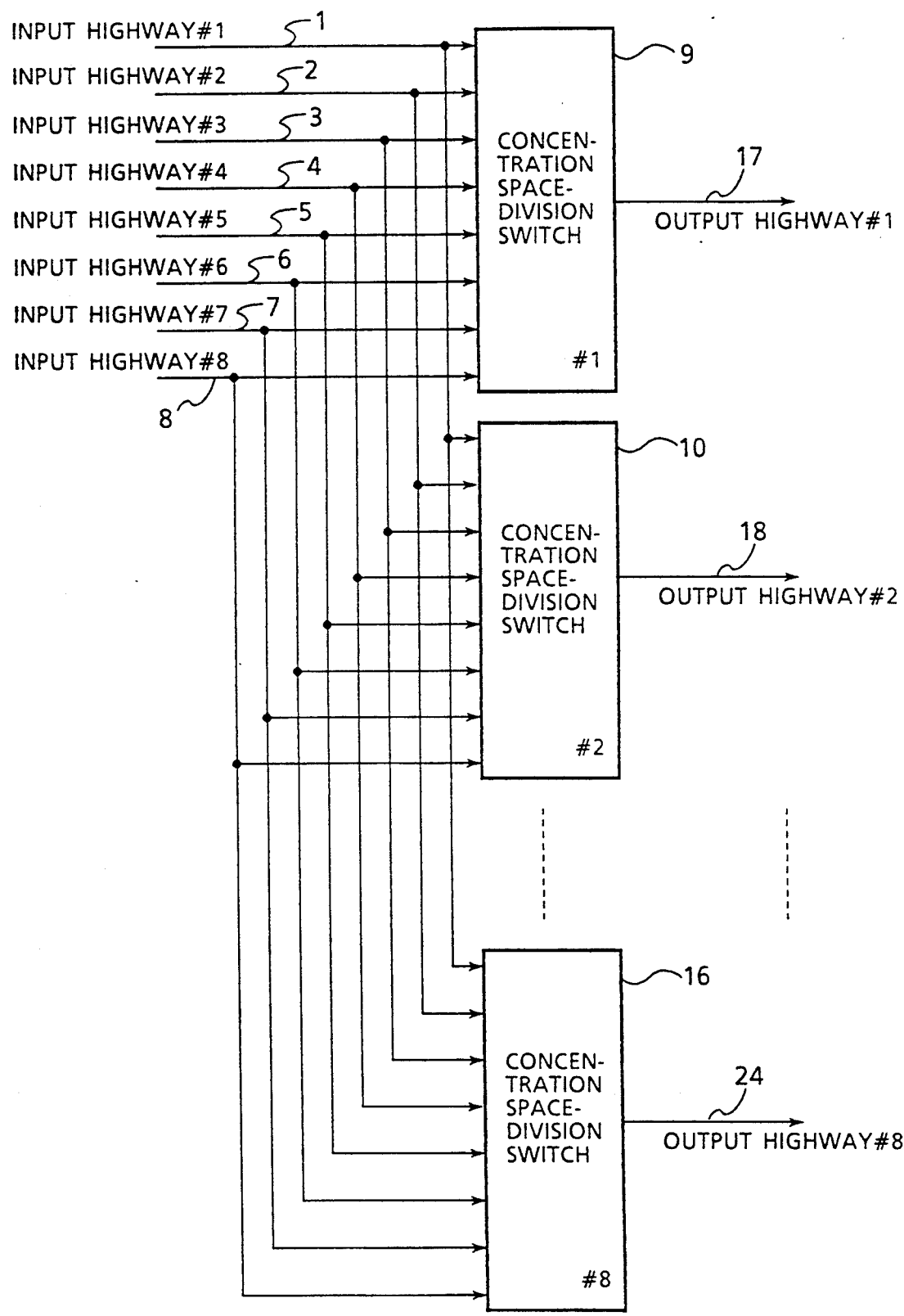
FIG. 1 is a schematic diagram showing the configuration of an ATM switch in an embodiment according to the present invention.

Referring now to the drawings, a description will be given of the principle of the present invention.

Figure 6:
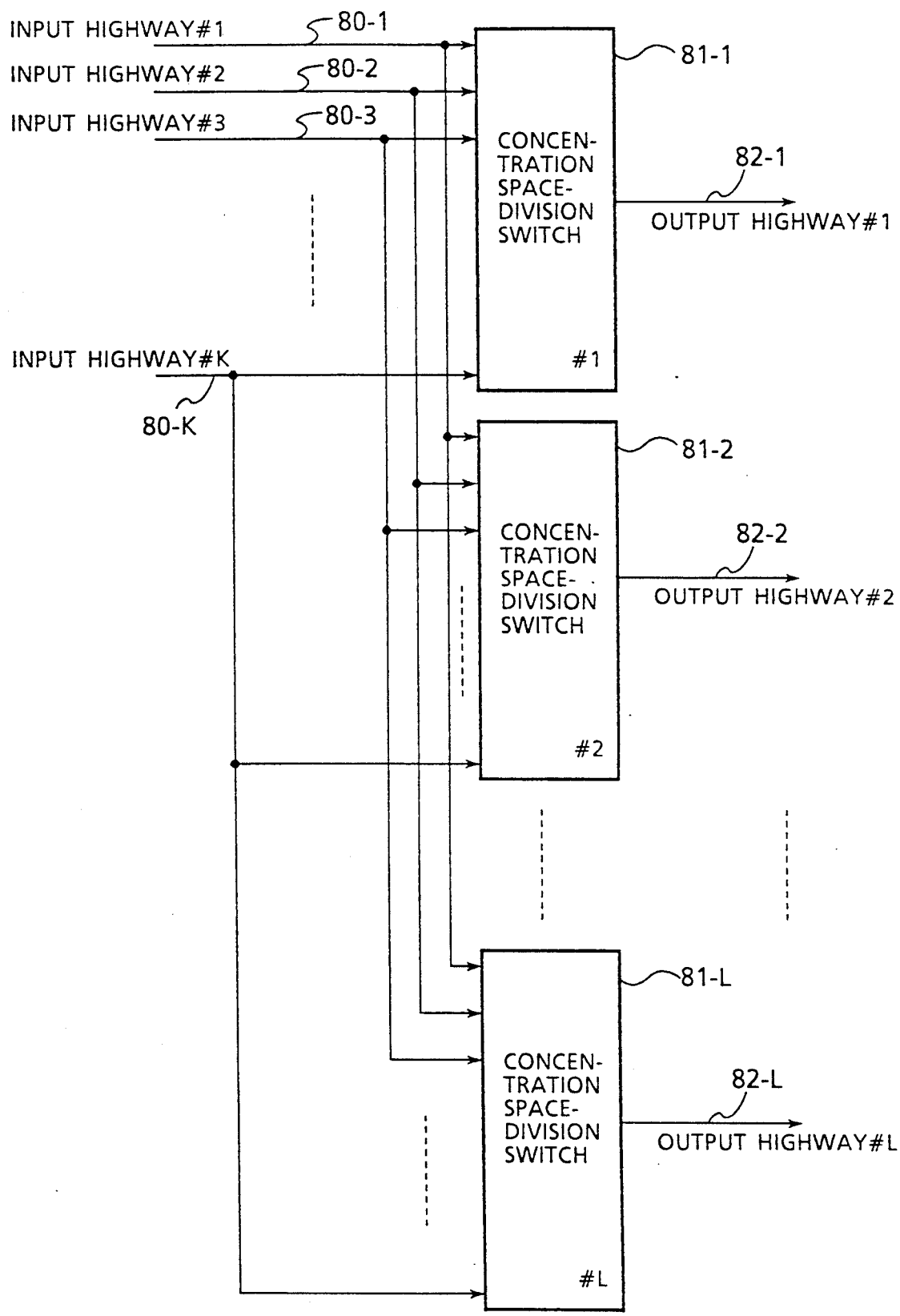
FIG. 6 is a diagram schematically showing the operation principle of the ATM switch according to the present invention.
Figure 7:
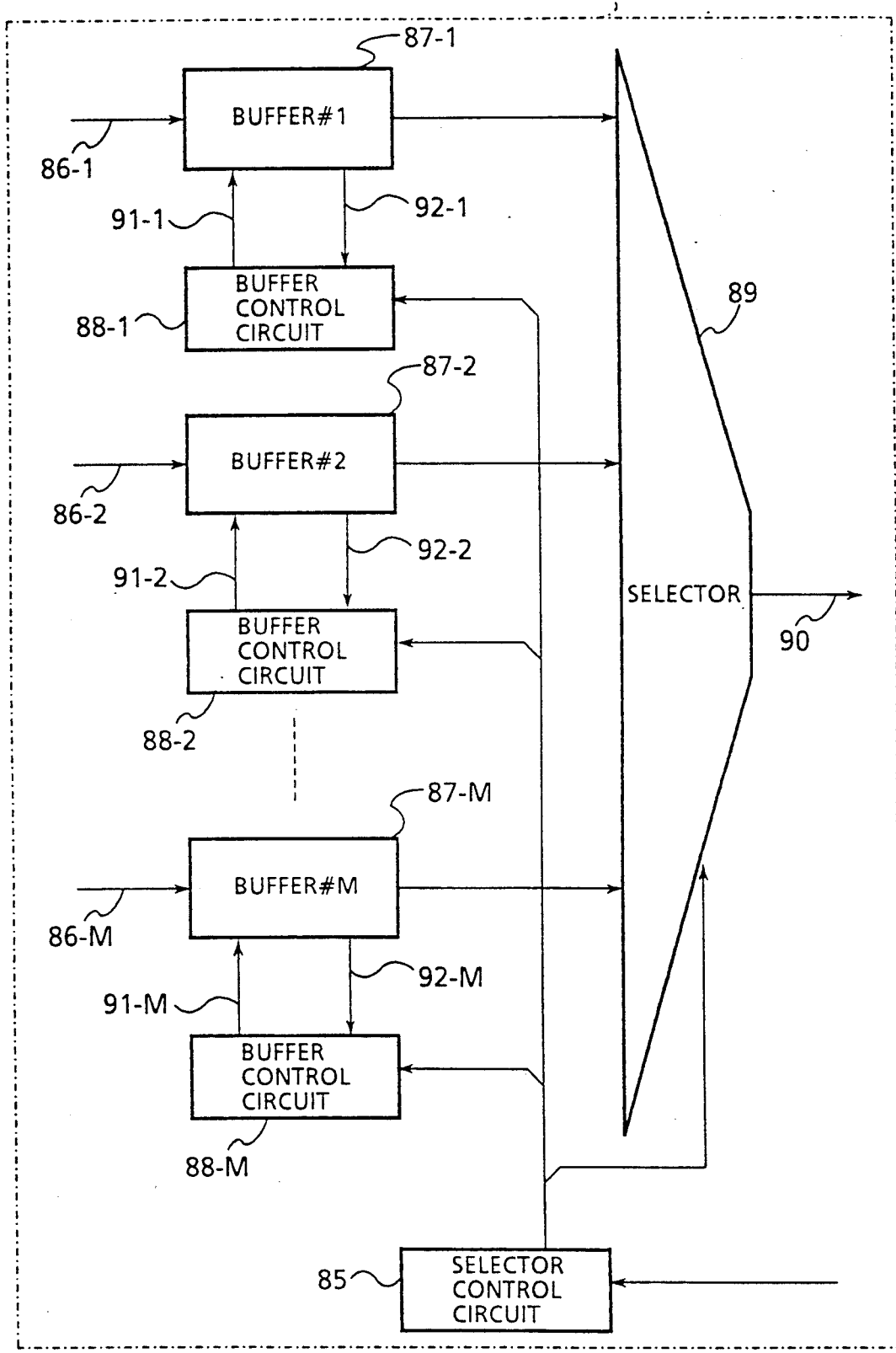
FIG. 7 is a diagram showing the structure of a switch module of the switch.

FIG. 6 shows the operational principle of an ATM switch configured with concentration space-division switches 81-1 to 81-L according to the present invention. As shown in FIG. 6, each of the concentration space-division switches disposed for the respective output highways accommodates K input highways (K is an integer not less than one) and 1 output highways (L is an integer not less than one) and includes K inputs and one output. For each of the switches, there are prepared switch modules each including, as shown in FIG. 7, M inputs (M is an integer not less than one), M buffers 87-1 to 87-M each having a storage capacity of N cells (N is an integer not less than one), M buffer control circuits 88-1 to 88-M for achieving read and write control operations on the respective buffers, a selector 89 for selecting an arbitrary one of the outputs from the M buffers, and a selector control circuit 85 for issuing an output instruction to an arbitrary one of the M buffer control circuits and for accomplishing a selector control on the selector 89. Each concentration space-division switch is configured as shown in FIG. 8.

Figure 8:
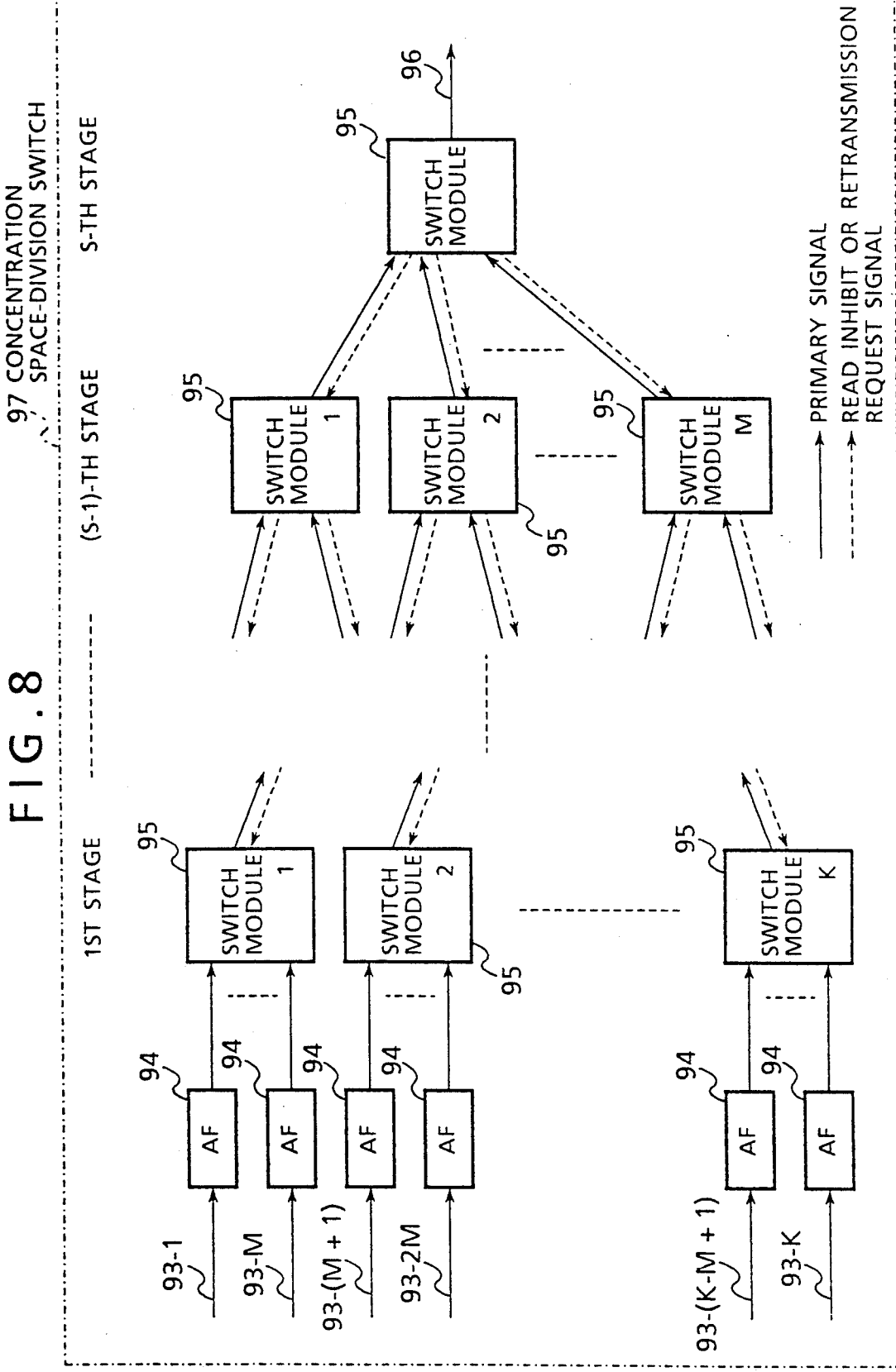
FIG. 8 is a diagram showing the overall constitution of a concentration space-division switch.

In the structure of FIG. 8, the switch modules are connected to each other in S stages (S is an integer not less than one) and the S-th stage includes one switch module. The (S−1)-th stage comprises M switch modules, the (S−2)-th stage comprises $M^2$ switch modules, and so on. In the configurational relationships between a switch module stage and one subsequent thereto, the number of switch modules in the preceding stage is attained by multiplying by at most M the number of switch modules in the succeeding stage; moreover, outputs from the switch modules in the preceding stage are connected to inputs of the switch modules in the succeeding stage. In the switch module arrangement, the total number of the inputs of switch modules belonging to a stage is at least K. With the switch modules thus connected to each other in the constitution above, a cell can be automatically transferred therethrough to an output highway; moreover, there needs only one kind of switch modules.

Figure 9:
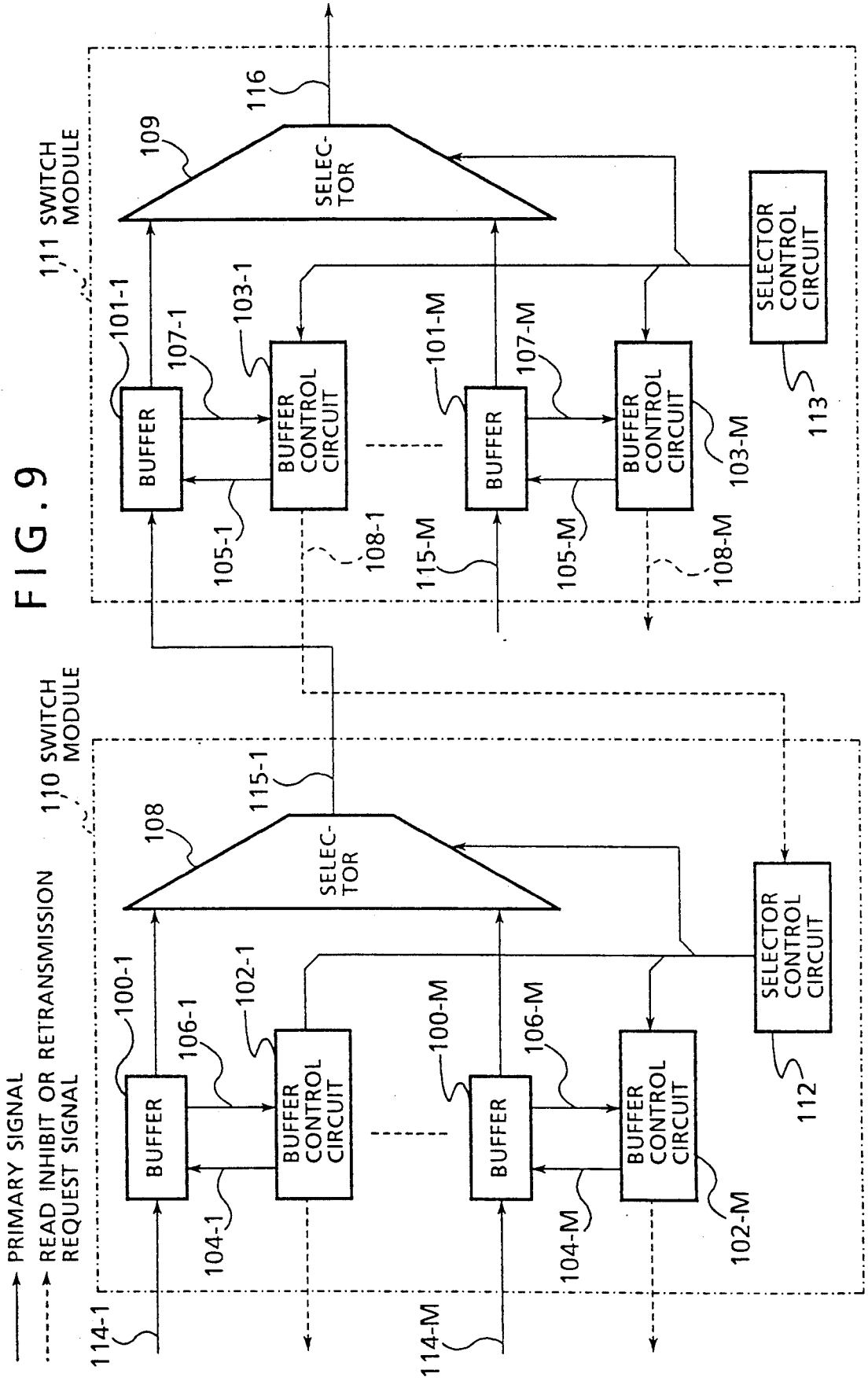
FIG. 9 is a diagram showing the detailed structure of FIG. 8.
Figure 10:
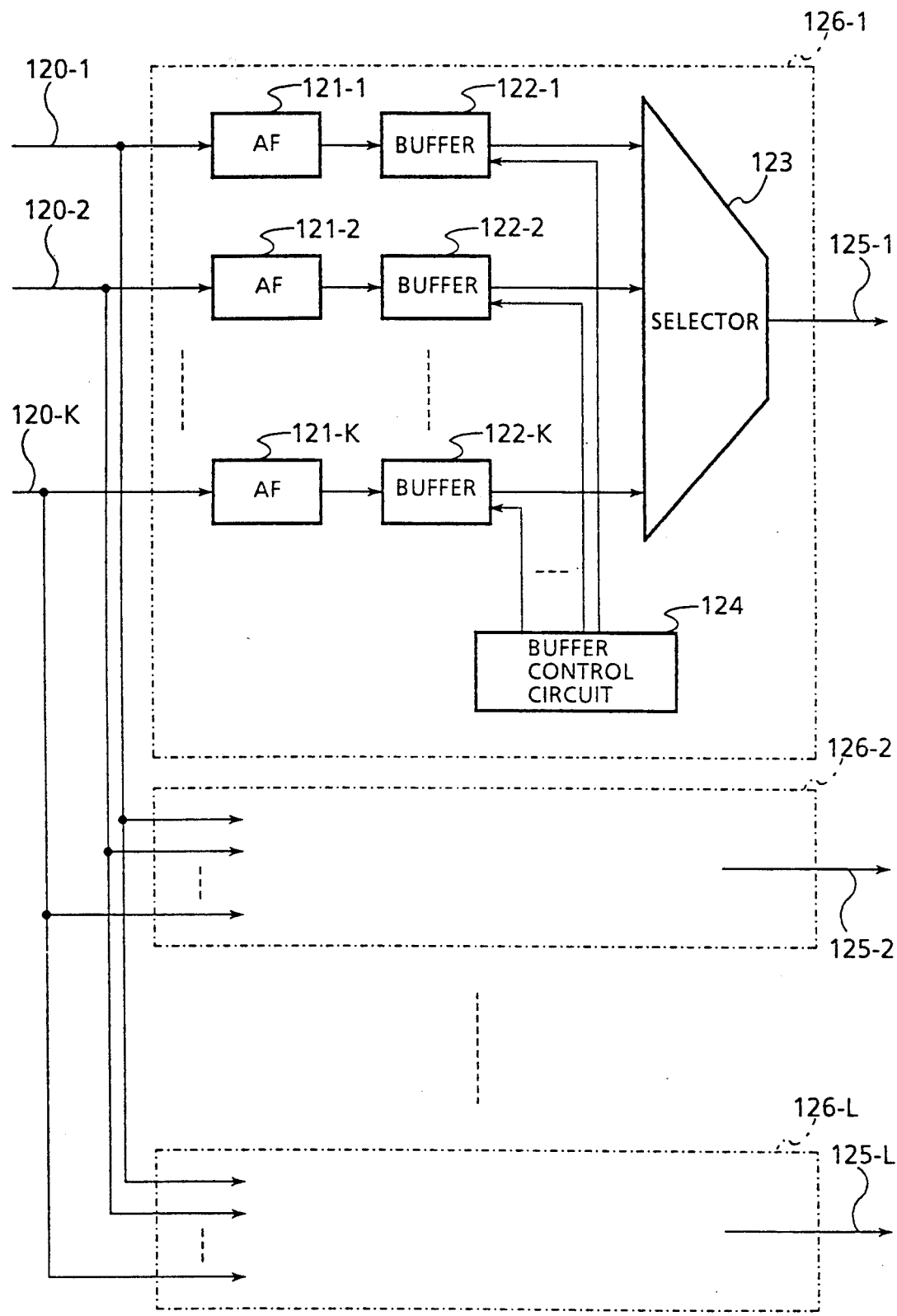
FIG. 10 is a diagram showing an example of the ATM switch.

Referring next to FIG. 9, a description will be given in the case where a cell may possibly be lost in a buffer of one of the switch modules. As shown here, if a buffer overflow is predicted in a buffer 101-1 of a switch module 111, a read inhibit signal is sent to a selector controller 112 related to a switch module 110 in a state preceding that of the switch module 111. On receiving the read inhibit signal, the selector control circuit 112 conducts a control operation to prevent the switch module 110 from transmitting a cell to the switch module 111. More concretely, the selector controller 112 does not issue an output instruction to any one of the buffer control circuits 102-1 to 102-M. That is, apparently, the switch modules are resultantly configured such that the buffers thereof are arranged in a cascade connection. As a result, the buffers may virtually be treated as a large-capacity buffer and hence the cell loss probability is reduced.

In an alternative case, as shown in FIG. 9, if a buffer overflow has occurred in the buffer 101-1 of the switch module 111, a retransmission request signal is sent to the selector controller 112 of the switch module 110 in the previous stage. In response to a reception of the retransmission request signal, the selector controller 112 issues a retransmission request to a buffer control circuit which has sent the cell discarded in the switch module 111. As a result, the switch module 110 retransmits a cell identical to the discarded cell to the switch module 111. Consequently, the switch modules are configured such that the buffers thereof are apparently arranged in a cascade connection. Resultantly, the buffers may virtually be treated as a large-capacity buffer and hence the cell loss probability can be decreased.

Referring now to FIG. 1, a description will be given of a specific embodiment of an ATM switch according to the present invention. As shown in FIG. 1, in an ATM switch of an individual buffer type accommodating eight input highways 1 to 8 and eight output highways 17 to 24, there are disposed eight concentration space-division switches 9 to 16 for the respective output highways 17 to 24. Each of the switches 9 to 16 includes a three-stage cascade connection of switch modules 29 as shown in FIG. 3. Furthermore, each switch module is constituted with, as can be seen from FIG. 2, two input lines 30-1 and 30-2, two buffers 31-1 and 31-2 each having a capacity of N cells (N is an integer not less than one), buffer control circuits 32-1 and 32-2 for accomplishing read and write controls on the associated buffers, a selector 33 for selecting an arbitrary one of the outputs from the two buffers, and a selector control circuit 37 for issuing a cell transmission request to an arbitrary one of the two buffer controllers 32-1 to 32-2 and for controlling the selector 33 in association with the request.

In operation, a cell transferred through any one of the input highways 40-1 to 40-8 has been assigned with a virtual path identifier (VPI) and an input highway number. On receiving the cell, one of the address filters (AFs) 41-1 to 41-8 decides based on the VPI and the input highway number whether or not the cell is sent to an output highway 43. If this is the case, the cell is transferred through the concentration space-division switch of FIG. 3 to the output highway 43.

Alternatively, if a cell received via an input highway has already been assigned with an output highway number, the address filter determines based on the output highway number whether or not the cell is passed to the output highway 43. If the transfer of the cell is granted, the cell is transmitted via the concentration space-division switch of FIG. 3 to the output highway 43.

Figure 4:
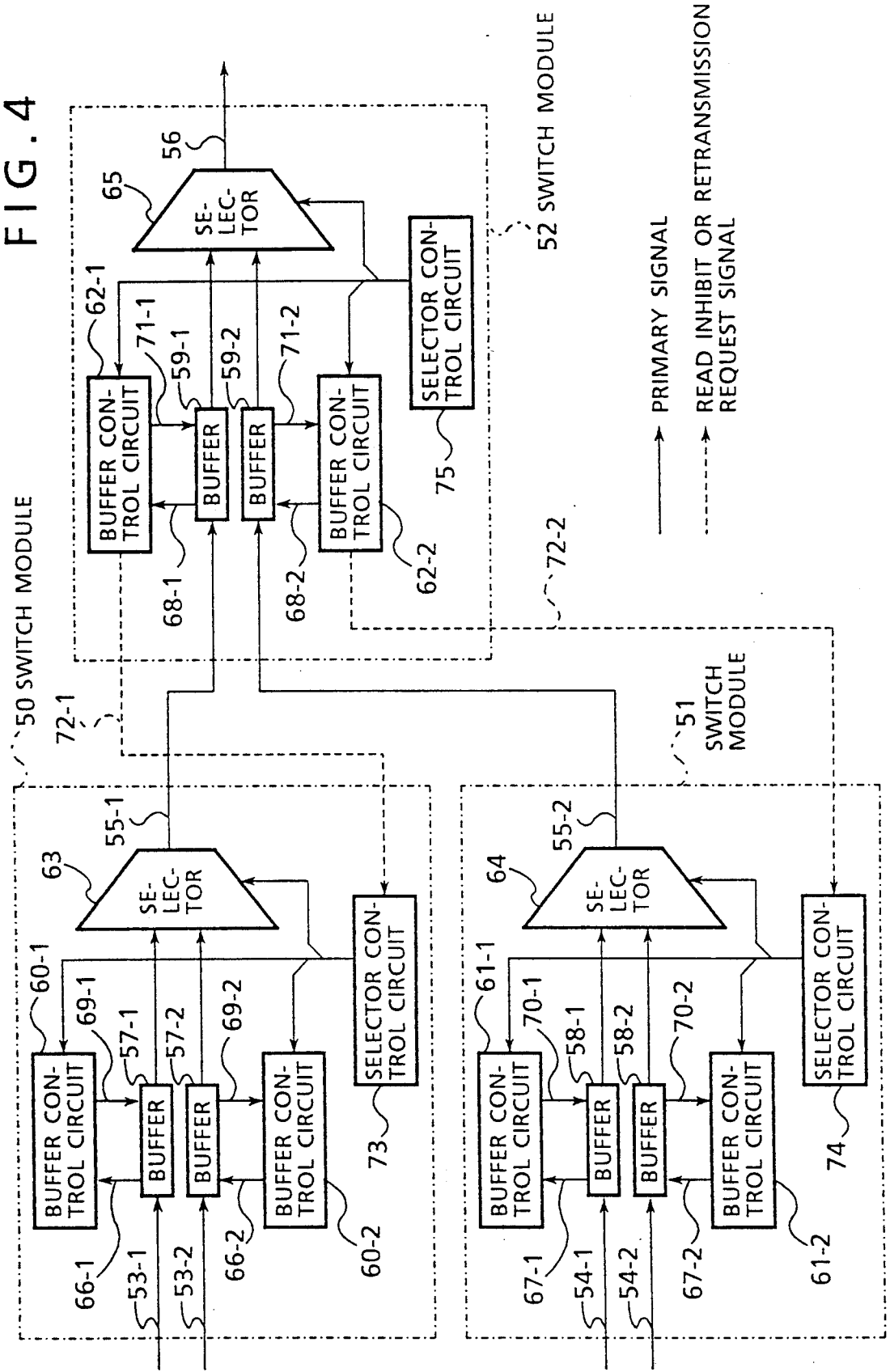
FIG. 4 is a diagram showing the detailed configuration of the switch of FIG. 3.

In the arrangement of the concentration space-division switch, the number of switch modules in a stage is twice that of switch modules in a stage subsequent thereto and outputs of the switch modules in the preceding stage are linked with inputs of those in the succeeding stage. That is, as shown in FIG. 4, the first and second stages respectively include four and two switch modules and the third stage includes one switch module, thereby connecting the switch modules of the respective stages in a cascade form. With the arrangement of the switch modules above, a cell can be automatically passed therethrough to an output highway; furthermore, this constitution necessitates only one kind of switch modules.

Referring next to FIG. 4, a description will be given of the case where it is predicted that a cell may be lost in a buffer of a switch module. As can be seen from the structure of FIG. 4, when a buffer overflow is forecasted in a buffer 59-1 of a switch module 52, a buffer controller 62-1 detects the condition of an overflow and then sends a read inhibit signal 72-1 to a selector controller 73 related to a switch module 50 in a stage preceding the stage of the switch module 52. On receiving the read inhibit signal 72-1, the selector control circuit 73 does not issue a cell transmission request to any one of the buffer controllers 60-1 and 60-2. This inhibits the switch module 50 from transmitting a cell to the switch module 52. That is, in this situation, the switch modules 50 and 52 are considered to be connected to each other in a cascade form and hence can be regarded as a large-capacity buffer, thereby minimizing the cell loss probability.

Next, the operation to be accomplished when a cell is lost in a buffer of a switch module will be described by referring to FIG. 4. As shown in the configuration of FIG. 4, when a buffer overflow is forecasted in the buffer 59-1 of the switch module 52, the buffer controller 62-1 detects the condition and then sends a retransmission request signal 72-1 to the selector controller 73 related to the switch module 50 in the preceding stage. On receiving the retransmission request signal 72-1, the selector control circuit 73 supplies a cell retransmission request to a buffer control circuit which has sent the cell discarded in the switch module 52. This instructs the switch module 50 to transmit a cell identical to the discarded cell to the switch module 52. Namely, it can be considered that the switch modules 50 and 52 are connected to each other in a cascade structure so as to form a large-capacity buffer, which consequently minimizes the cell loss probability.

Figure 2:
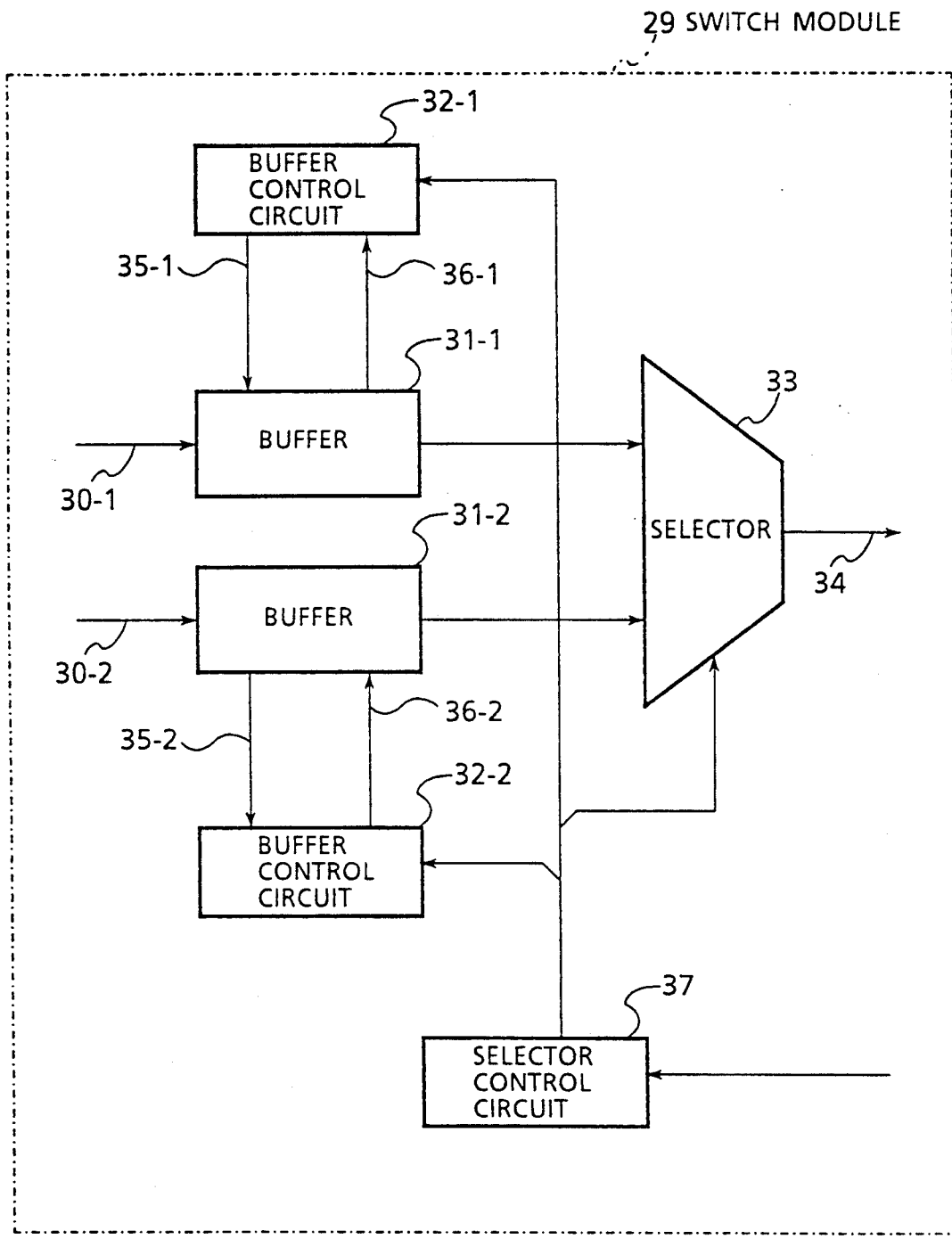
FIG. 2 is a diagram illustratively showing the structure of a switch module of the embodiment.
Figure 3:
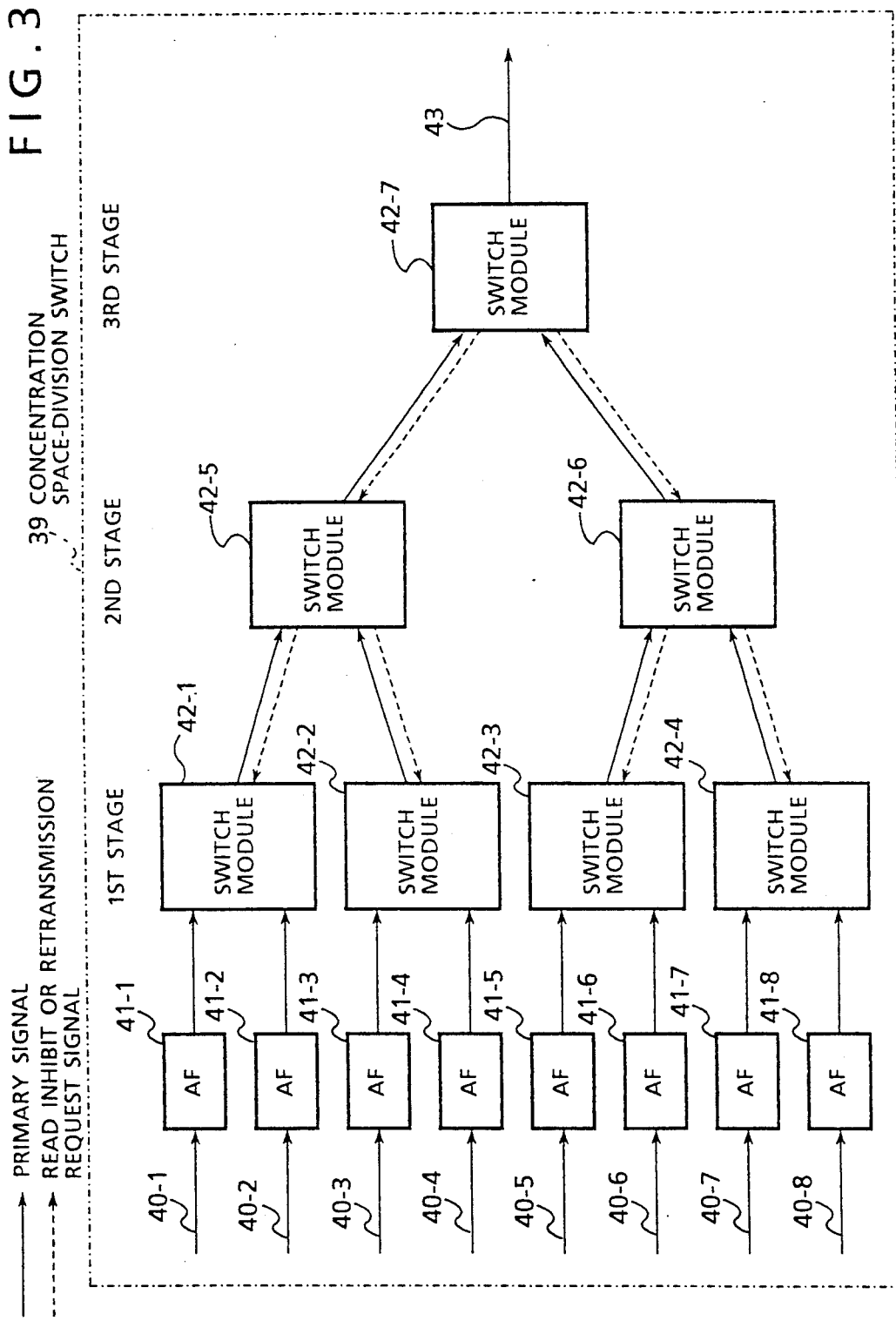
FIG. 3 is a diagram showing the overall constitution of a concentration space-division switch.

Referring now to FIG. 2, a description will be given of a method of outputting cells from two buffers disposed in a switch module. In the operation of a switch module 29, cells are alternately outputted from buffers 31-1 and 31-2 in an ordinary case. When the cell is missing in either one of the buffers, the switch module 29 sequentially outputs cells from the other one thereof. Thereafter, when both buffers are loaded with cells, the cell transmission is again achieved in an alternate manner from the buffers 31-1 and 31-2.

Figure 5:
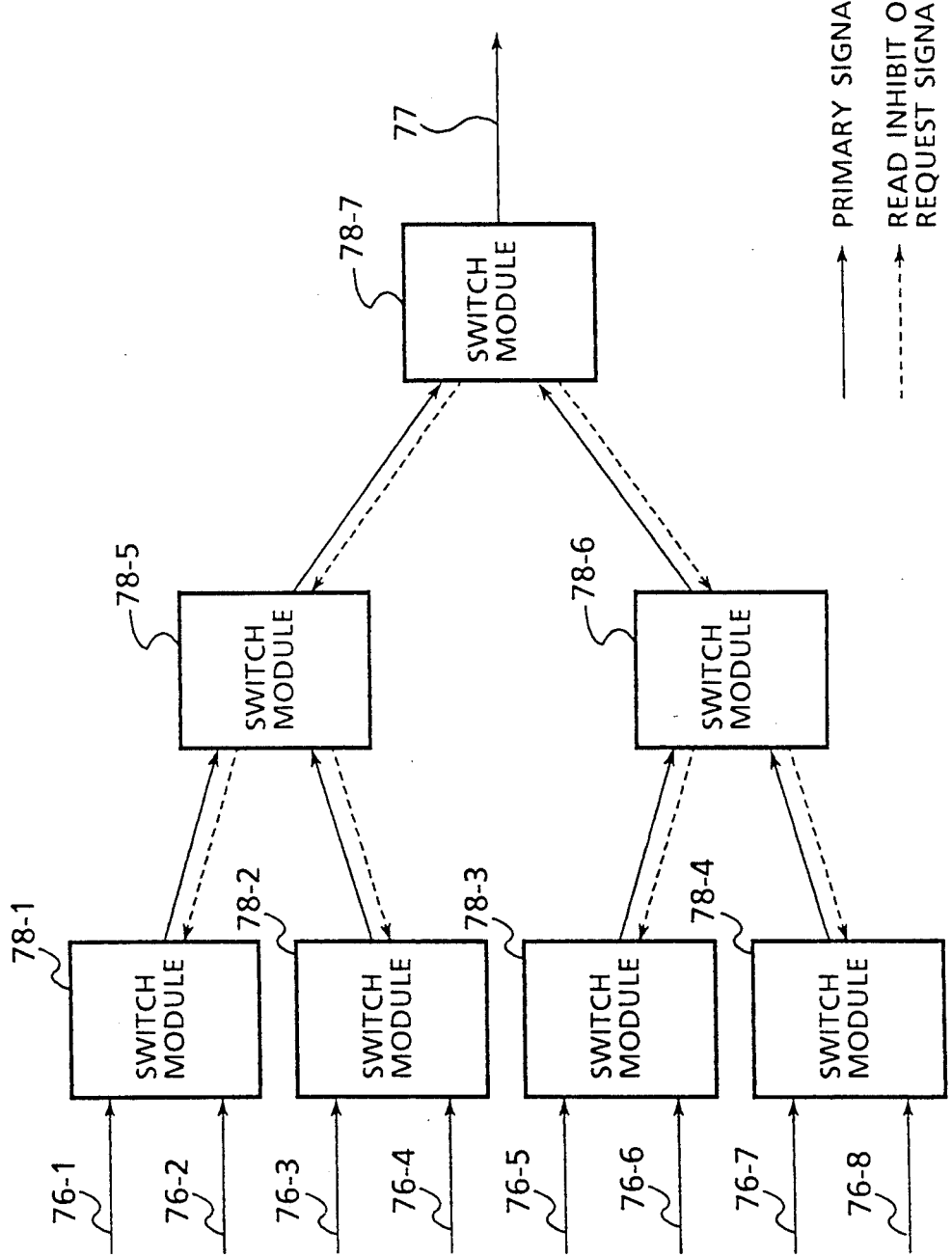
FIG. 5 is a schematic diagram showing the construction of an ATM multiplexer in an embodiment according to the present invention.

Based on the configuration of FIG. 5, a description will be given of an embodiment of an ATM multiplexer according to the present invention. As can be seen from FIG. 5, an ATM multiplexer accommodating eight input highways 76-1 to 76-8 and an output highway 77 includes a three-stage connection of switch modules (FIG. 5). Each switch module comprises, like in the case of FIG. 2, two inputs 30-1 and 30-2, two buffers 31-1 and 31-2 each having a capacity of 32 cells, buffer controllers 32-1 and 32-2, a selector 33 for selecting an arbitrary one of the outputs from the two buffers, and a selector control circuit 37 for sending a cell transmission instruction to an arbitrary one of the buffer control circuits and for accomplishing a control operation on the selector 33 in association with the cell transmission instruction. In the arrangement of the switch modules, the number of switch modules is twice that of switch modules in a stage subsequent thereto and outputs of the switch modules in the preceding stage are connected to inputs of the switch modules in the succeeding stage. That is, as shown in FIG. 5, the first and second stages respectively include four and two switch modules and the third stage comprises one switch module. With the provision above, a cell can be automatically transmitted through the switch modules to the output highway; furthermore, the configuration necessitates only one kind of switch modules.

Next, referring to FIG. 4, a description will be given of the case where a cell loss is forecasted in a buffer of either one of the switch modules. As can be seen from the constitution of FIG. 4, when a buffer overflow is predicted in the buffer 59-1 of the switch module 52, the buffer control unit 62-1 recognizes the condition of an overflow and then issues a read inhibit signal 72-1 to the selector controller 73 associated with the switch module 50 in a stage preceding the stage of the switch module 52. When the read inhibit signal 72-1 is received, the selector control circuit 73 stops issuing a cell transmission request to the buffer controllers 60-1 and 60-2. This prevents the switch module 50 from sending a cell to the switch module 52. Namely, in this arrangement, the switch modules 50 and 52 are apparently connected to each other in a cascade constitution and hence can be considered to form a large-capacity buffer, thereby decreasing the cell loss probability.

Subsequently, the operation to be conducted when a cell is lost in a buffer of a switch module will be described by reference to the configuration of FIG. 4. As can be seen from FIG. 4, when a buffer overflow is predicted in the buffer 59-1 of the switch module 52. The buffer controller 62-1 detects the condition and then delivers a retransmission request signal 72-1 to the selector controller 73 of the switch module 50 in the preceding stage. On receiving the retransmission request signal 72-1, the selector control circuit 73 sends a cell retransmission request to a buffer control circuit which has sent the cell discarded in the switch module 52. This resultantly instructs the switch module 50 to transmit a cell identical to the discarded cell to the switch module 52. Namely, the switch modules 50 and 52 are virtually connected to each other in a cascade form so as to configure a large-capacity buffer, which accordingly lowers the cell loss probability.

Referring next to FIG. 2, a description will be given of a method of outputting cells from two buffers disposed in a switch module. In an ordinary case, the switch module 29 alternately outputs cells from the buffers 31-1 and 31-2. When the cell is missing in either one of the buffers, the switch module 29 sequentially outputs cells from the other one of the buffers. Thereafter, when cells are found in both buffers, the switch module 29 accomplishes again the cell transmission in an alternate manner from the buffers 31-1 and 31-2.

An alternative example of the switch module operation will be described by reference to FIG. 13. In this structure, when a buffer overflow is predicted in a buffer memory 52 of a switch module 57, a read inhibit signal is sent to a buffer memory controller 53 of a switch module 56 in the previous stage. On receiving the read inhibit signal, the buffer memory controller 53 in the switch module 56 inhibits the switch module 56 from transmitting a cell to the switch module 57. Namely, in this arrangement, the buffer memories of the switch modules are virtually connected to each other in a cascade constitution and hence can be considered to form a large-capacity buffer, thereby decreasing the cell loss probability.

Figure 13:
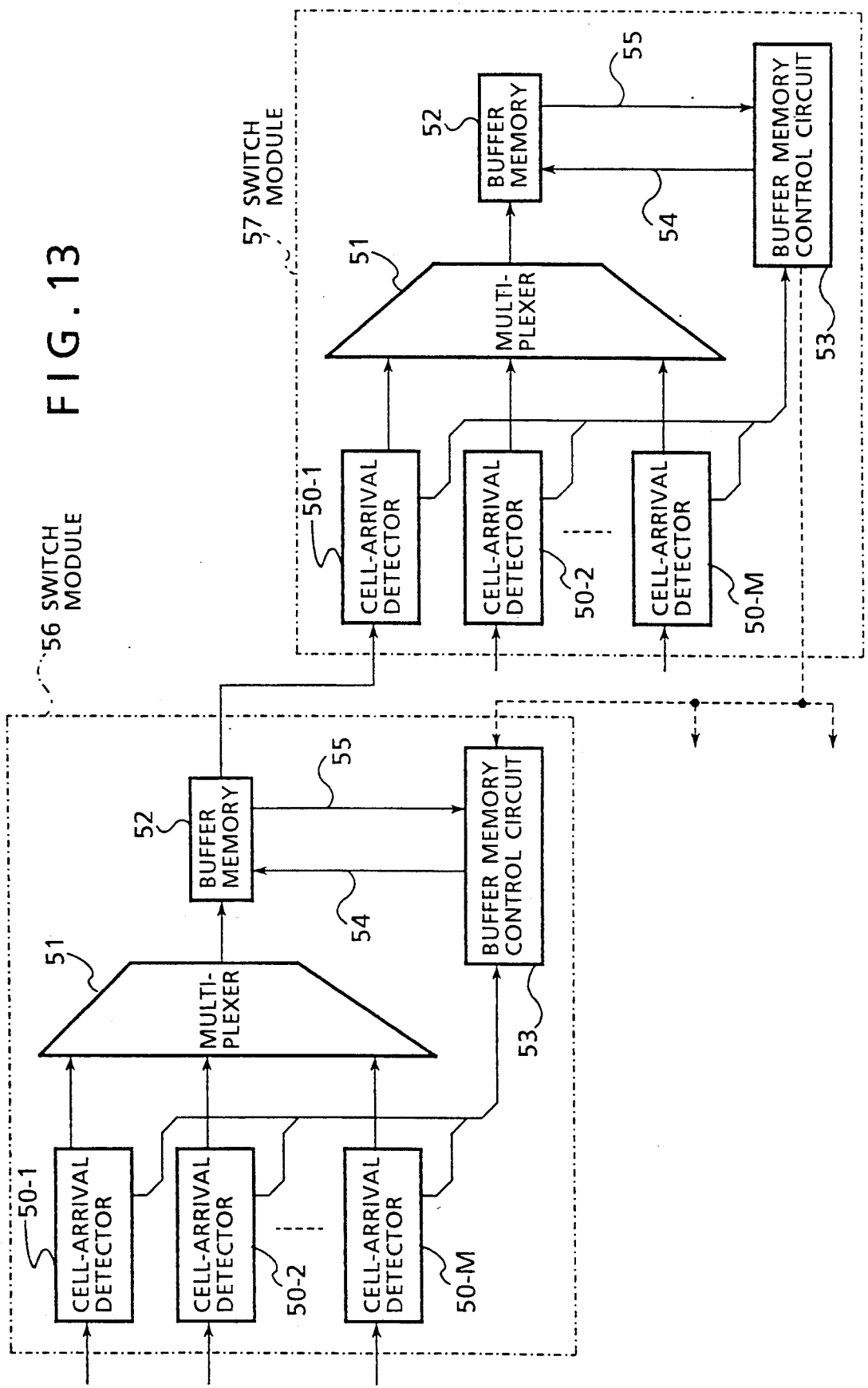
FIG. 13 is a diagram showing the detailed constitution of a concentration space-division switch.

Alternatively, as can be seen from FIG. 13, when a buffer memory overflow takes place in the buffer 52 of the switch module 57. A retransmission request signal is sent to the buffer memory control circuit 53 of the switch module 56 in the preceding stage. On receiving the retransmission request signal 72-1, the buffer memory control circuit 53 disposed in the switch module 56 issues a cell retransmission request for a retransmission of the cell lost in the switch module 57. As a result, the switch module 56 transmits a cell identical to the discarded cell to the switch module 57. Namely, the buffer memories of the switch modules are apparently connected to each other in a cascade structure so as to form a large-capacity buffer, which accordingly decreases the cell loss probability.

In this connection, each of the switch modules 56 and 57 includes, as shown in FIG. 13, cell-arrival detectors 50-1 to 50-M for respectively detecting an arrival of a cell from M input lines, a multiplexer 51 for multiplexing the received cells through a cell interleaving operation to produce a signal onto an output line, a buffer memory 52 for storing therein cells delivered from the multiplexer 51, and a buffer memory control circuit 53 for achieving, based on a cell-arrival signal from one of the cell-arrival circuits, a write control when a received cell is written in the buffer memory 52 and a read control when a cell is to be read therefrom.

Figure 14:
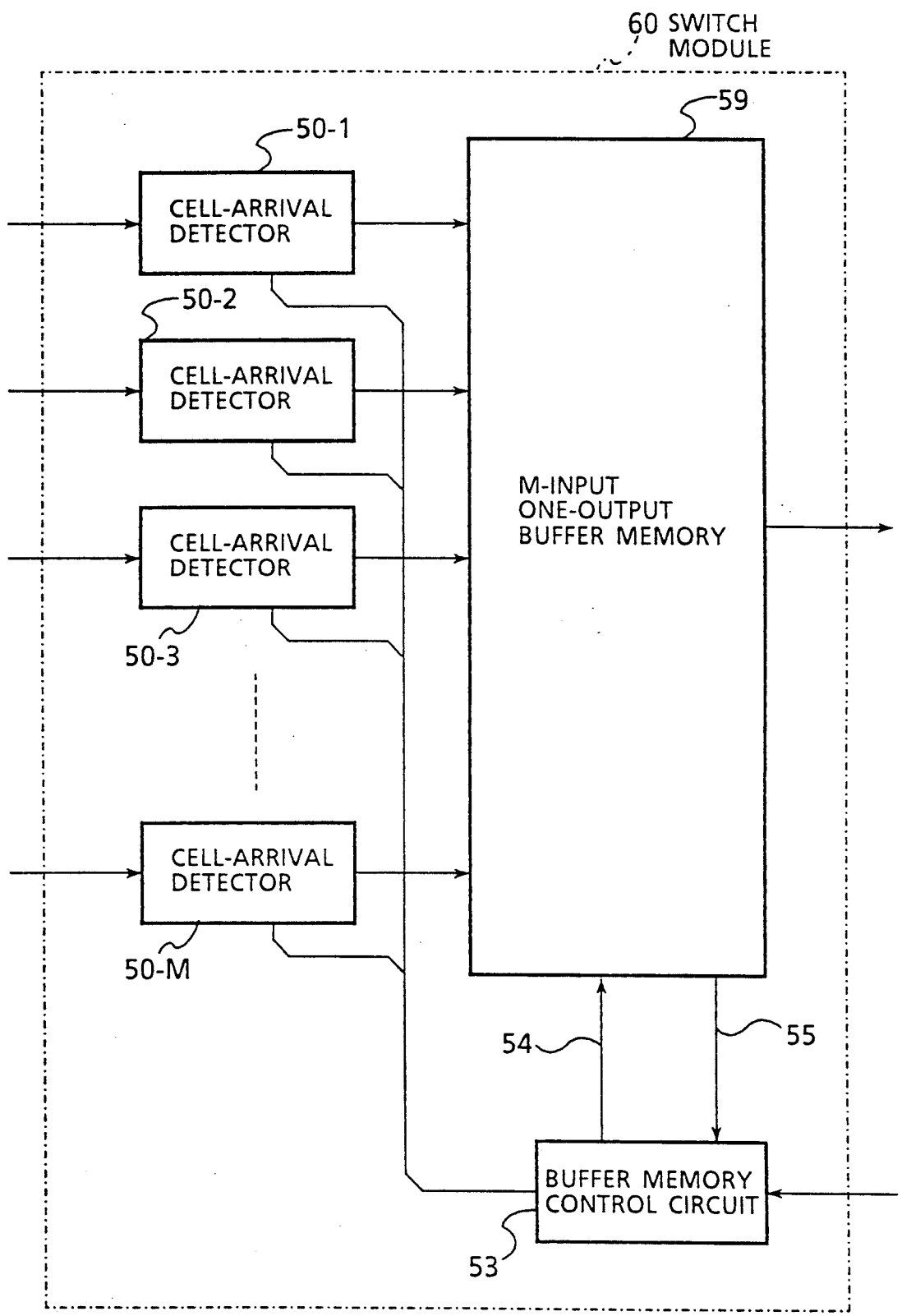
FIG. 14 is a diagram showing a still another example of the switch module.

Alternatively, the switch module above may be constituted, as shown in FIG. 14, with a buffer memory 59 having M inputs and an output, cell-arrival detectors 50-1 to 50-M, and a buffer memory control circuit 53 for achieving, in response to a cell-arrival signal from one of the cell-arrival circuits, a write control operation when a received cell is written in the buffer memory 52 and a read control when a cell is to be read therefrom.

Moreover, the concentration space-division switch 97 of FIG. 8 may also be adopted as a multiplexer.

In addition, the cell storage capacity may vary between the buffer memories disposed in the respective switch modules.

Figure 11:
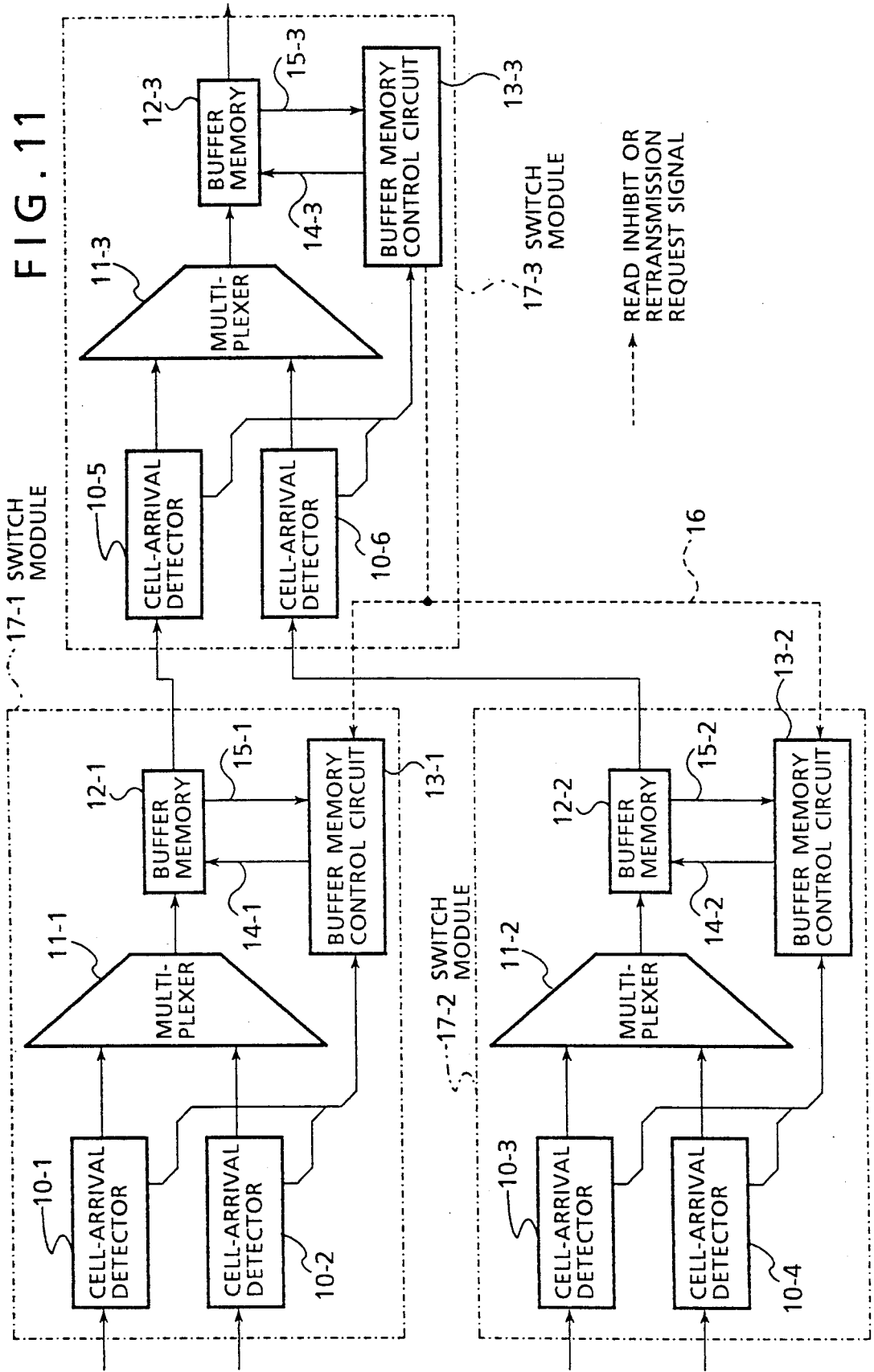
FIG. 11 is a diagram showing the detailed configuration of the ATM switch of FIG. 1.

Furthermore, in an ATM switch of an individual buffer type for accomplishing a switching operation of cells between eight input highways and eight output highways (FIG. 1), there may be employed eight concentration space-division switches 9 to 16 each having eight input highways and one output highway as shown in FIG. 3. Each of the concentration space-division switches is constituted with a three-stage cascade connection of switch modules each including, as shown in FIG. 11, a multiplexer 11 having two inputs and an output, two cell-arrival detectors 10 each for detecting an arrival of a cell from an input highway, a buffer memory 12 having a capacity of N cells (N is an integer not less than one), and a buffer memory control circuit 13 for achieving cell write and read control operations on the buffer memory.

A cell transferred through an input highway has been assigned with a virtual path identifier (VPI) and an input highway number. An address filter (FIG. 3) determines, based on the VPI and the input highway number, whether or not the cell is sent to the output highway. If the transfer is granted, the cell is transmitted via the concentration space-division switch of FIG. 1 to the output highway.

In an alternative case where the cell received via the input highway has already been assigned with an output highway number, the address filter decides, depending on the output highway number, whether or not the cell is transmitted to the output highway. If the transfer is allowed, the cell is sent via the concentration space-division switch of FIG. 1 to the output highway.

In this constitution, the number of switch modules in a stage of the concentration space-division switch is, as shown in FIG. 3, twice that of switch modules in a stage subsequent thereto; moreover, outputs of the switch modules in the preceding stage are connected to inputs of the switch modules in the succeeding stage. Namely, as can be seen from the constitution of FIG. 3, the first, second, and third stages respectively include four switch modules, two switch modules, and one switch module in a cascade structure. According to the arrangement of the switch modules, a cell can be automatically passed therethrough to an output highway; furthermore, only one kind of switch modules are required in this configuration.

Next, when it is predicted that a cell may be lost in a buffer memory of a switch module, a read inhibit signal is sent to a switch module in the preceding stage (FIG. 3). On detecting the read inhibit signal, the switch module stops outputting a cell to the switch module in the succeeding stage. When the cell loss probability is removed, the pertinent switch module terminates outputting the read inhibit signal to the switch module in the preceding stage, thereby resuming the cell transmission. Referring now to FIG. 11, the processing of this operation will be described in detail. In this constitution, when a buffer overflow is predicted in a buffer memory 12-3 of the switch module 17-3. A buffer memory control circuit 13-3 detects the condition and then transmits a read inhibit signal 16 to buffer memory control circuits 13-1 and 13-2 respectively of the switch modules 17-1 and 17-2. When the read inhibit signal 16 is received, the buffer memory controllers 13-1 and 13-2 stop issuing a cell transmission request to the buffer memories 12-1 and 12-2, respectively. As a result, the system prevents the cell transmission from being the switch modules 17-1 and 17-2 to the switch module 17-3. In consequence, the buffer memories respectively of the switch modules 17-1 and 17-2 are apparently connected to each other in a cascade structure to virtually form a large-capacity buffer, thereby minimizing the cell loss probability.

Referring again to FIG. 11, a description will be given of the case where a cell is lost in a buffer of either one of the switch modules. In the case where a buffer overflow has taken place in the buffer memory 12-3 of the switch module 17-3, the buffer memory controller 13-3 detects the condition and then sends a retransmission request signal 16 to the buffer memory controllers 13-1 and 13-2 respectively of the switch modules 17-1 and 17-2 in the preceding stage. On receiving the retransmission request signal 16, the buffer memory controllers 13-1 and 13-2 issue a retransmission request for the cell discarded in the switch module 17-3. Consequently, the buffer memories 12-1 and 12-2 respectively of the switch modules 17-1 and 17-2 are considered to be connected to each other in a cascade structure to virtually configure a large-capacity buffer, which resultantly minimizes the cell loss probability.

In this connection, each of the switch modules includes, as shown in FIG. 11, two cell-arrival detectors 10 (10-1 to 10-6), a multiplexer 11 (11-1 to 11-3) for multiplexing the received cells through a cell interleaving operation to produce a signal onto an output line, a buffer memory 12 (12-1 to 12-3) for storing therein a cell received from the multiplexer, and a buffer memory control circuit 13 (13-1 to 13-3) for achieving, based on a cell-arrival signal from one of the cell-arrival detectors, a write control when storing a received cell in the buffer memory and a read control when reading a cell therefrom.

Figure 12:
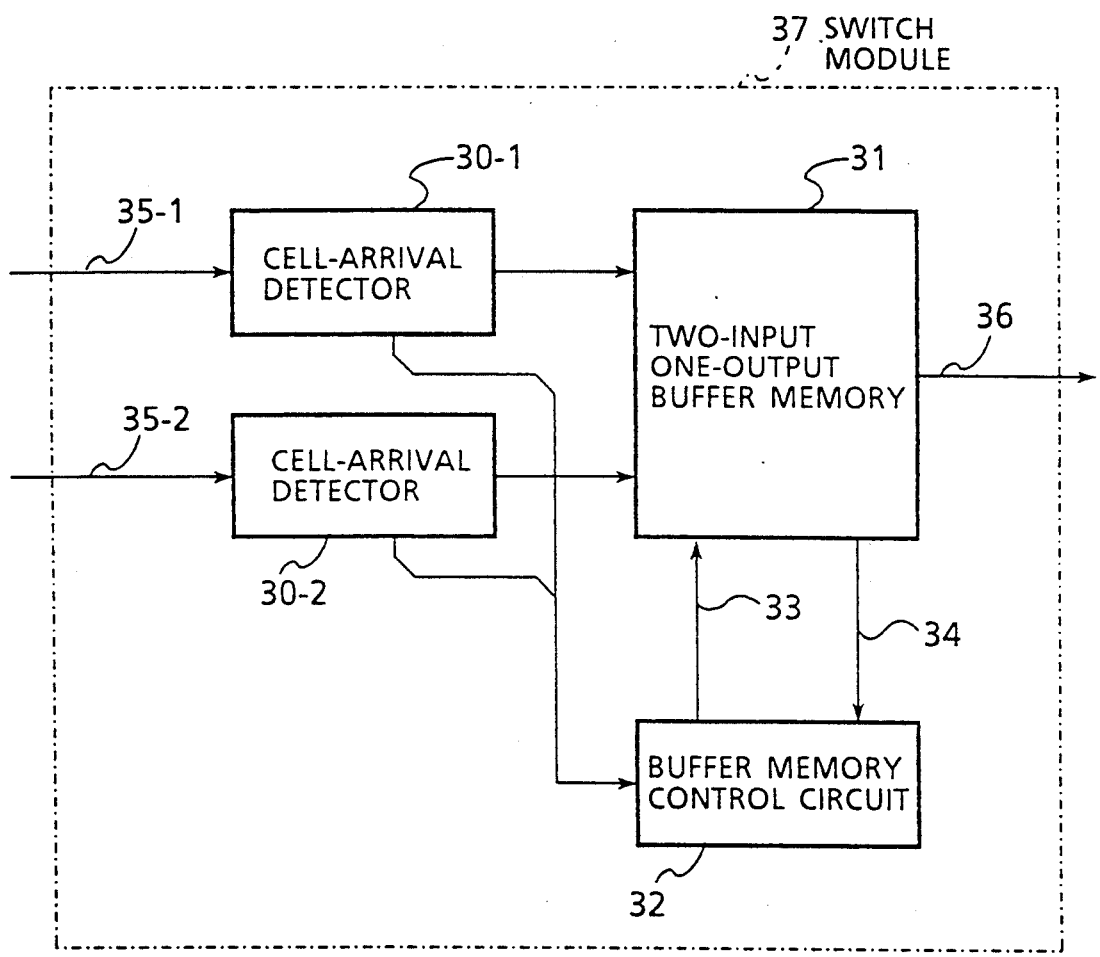
FIG. 12, is a diagram showing another example of the switch module.

Alternatively, the switch module may comprise, as shown in FIG. 12, a buffer memory 31 having two inputs and an output, cell-arrival detectors 30-1 and 30-2, and a buffer memory control circuit 32 for conducting, depending on a cell-arrival signal from one of the cell-arrival detectors, a write control when writing a received cell in the buffer memory and a read control when obtaining a cell therefrom.

In this case, the cell-arrive detector may have the function of the address filter so as to omit the address filter.

In addition, the concentration space-division switch 39 shown in FIG. 3 may be employed as a multiplexer.

According to the present invention, only one kind of switch modules are required to constitute the switch; furthermore, the cell loss probability can be reduced through a simple control operation.

As many apparently widely different embodiments of the present invention can be made without departing from the spirit and scope thereof it is to be understood that the invention is not limited to the specific embodiments thereof except as defined in the appended claims.

We claim:

1. An ATM switch of an individual buffer type accommodating K (K is an integer not less than one) input highways and L (L is an integer not less than one) output highways, comprising L concentration space-division switches, each of said concentration space-division switches coupled to said K input highways and an output highway of said L output highways including a plurality of switch modules coupled to each other in an S-stage structure (S is an integer not less than one),
   wherein each of said switch modules comprises:
   M buffers respectively coupled to M inputs (M is an integer not less than one);
   M buffer control circuits which conduct write and read control operations respectively on said M buffers;
   a selector which selects an arbitrary one of outputs from said M buffers; and
   a selector control circuit which issues an output instruction to an arbitrary one of said buffer control circuits and achieves a selector control operation associated therewith,
   wherein said S-stage structure comprises:
   S stages;
   each of said stages except an S-th stage including switch modules, of said plurality of switch modules, a number of which is obtained by multiplying by at most M a number of switch modules in a stage subsequent thereto;
   said S-th stage, which is a final stage, constituted with one switch module;
   each of said stages except said S-th stage having outputs coupled to inputs of a stage subsequent thereto and said S-th stage having an output.

2. An ATM switch according to claim 1 wherein $M=2$.

3. An ATM switch according to claim 2 wherein in the case of $K=L=2^S$, a first stage includes $2^{S-1}$ switch modules, a second stage includes $2^{S-2}$ switch modules, ..., and an S-th stage includes one ($2^0$) switch module.

4. An ATM switch according to claim 1, wherein each of said M buffer control circuits detects a condition that a cell loss is predicted due to a buffer overflow in a corresponding buffer in a switch module, and then sends a read inhibit signal to the corresponding selector control circuit in the preceding stage, the corresponding selector control circuit stops a cell transmission request to the corresponding buffer control circuit.

5. An ATM switch according to claim 1 wherein each of said M buffer control circuits detects a condition that a cell loss has taken place due to a buffer overflow in a corresponding buffer in a switch module, and then sends a retransmission signal to a corresponding selector control circuit in the preceding stage, the corresponding selector control circuit supplying a cell retransmission request to the corresponding buffer control circuit.

6. An ATM switch according to claim 2 wherein said two buffers of said switch module are accessed such that:
   cells are alternately read therefrom in an ordinary case;
   cells are sequentially read, when either one of said buffers is empty, from other one thereof; and
   cells are again alternately read, when said buffers are both loaded with cells, from said two buffers in an alternate fashion.

7. An ATM multiplexer accommodating K (K is an integer not less than one) input highways and an output highway, comprising a plurality of switch modules coupled to each other in an S-stage structure (S is an integer not less than one),
   wherein each of said switch modules comprises:
   M buffers respectively coupled to M inputs (M is an integer not less than one);
   M buffer control circuits which conduct write and read control operations respectively on said M buffers;
   a selector which selects an arbitrary one of outputs from said M buffers; and
   a selector control circuit which issues an output instruction to an arbitrary one of said buffer control circuits and achieves a selector control operation associated therewith,
   wherein said S-stage structure comprises:
   S stages;
   each of said stages except an S-th stage including switch modules, of said plurality of switch modules, a number of which is obtained by multiplying by at most M a number of switch modules in a stage subsequent thereto;
   said S-th stage, which is a final stage, constituted with one switch module;
   each of said stages except said S-th stage having outputs coupled to inputs of a stage subsequent thereto and said S-th stage having an output.

8. An ATM multiplexer according to claim 7 wherein $M=2$.

9. An ATM multiplexer according to claim 8 wherein in the case of $K=L=2^S$, a first stage includes $2^{S-1}$ switch modules, a second stage includes $2^{S-2}$ switch modules, ..., and an S-th stage includes one ($2^0$) switch module.

10. An ATM multiplexer according to claim 7, wherein each of said M buffer control circuits detects a condition that a cell loss is predicted due to a buffer overflow in a corresponding buffer in a switch module, and then sends a read inhibit signal to a corresponding selector control circuit in the preceding stage, the corresponding selector control circuit stops a cell transmission request to the corresponding buffer control circuit.

11. AN ATM multiplexer according to claim 7, wherein each of said M buffer control circuits detects a condition that a cell loss has taken place due to a buffer overflow in a corresponding buffer in a switch module, and then sends a retransmission signal to a corresponding selector control circuit in the preceding stage, the corresponding selector control circuit supplying a cell retransmission request to the corresponding buffer control circuit.

12. An ATM switch according to claim 8 wherein said two buffers of said switch module are accessed such that:
- cells are alternately read therefrom in an ordinary case;
- cells are sequentially read, when either one of said buffers is empty, from other one thereof; and
- cells are again alternately read, when said buffers are both loaded with cells, from said two buffers in an alternate fashion.

13. An ATM switch of an individual buffer type having, in order to achieve a switching operation of asynchronously multiplexed cells between K (K is an integer not less than one) input highways and L (L is an integer not less than one) output highways, concentration space-division switches respectively for said output highways, each of said concentration space-division switches possessing K inputs and an output and including a plurality of switch modules coupled to each other in an S-stage structure (S is an integer not less than one),
wherein each of said switch modules has buffer means for multiplexing M inputs (M is an integer not less than one) into an output, said buffer means including a buffer memory and a buffer memory control circuit,
wherein said S-th stage structure comprises:
S stages;
each of said stages except an S-th stage including switch modules, of said plurality of switch modules, a number of which is obtained by multiplying by at most M a number of switch modules in a stage subsequent thereto;
said S-th stage, which is a final stage, constituted with one switch module;
each of said stages except said S-th stage having outputs coupled to inputs of a stage subsequent thereto and said S-th stage having an output.

14. An ATM switch according to claim 13 wherein each said switch module comprises:
a multiplexer for multiplexing cells received from said M inputs through a cell interleaving operation;
a buffer memory for storing therein cells produced from said multiplexer; and
a buffer memory control circuit for issuing cell write and read instructions to said buffer memory.

15. An ATM switch according to claim 13 wherein each said switch module comprises:
a buffer memory having M inputs and an output for storing therein cells received from said M inputs; and
a buffer memory control circuit for issuing cell write and read instructions to said buffer memory.

16. An ATM switch according to claim 13 wherein $M=2$.

17. An ATM switch according to claim 16 wherein in the case of $K=L=2^S$, a first stage includes $2^{S-1}$ swtich modules, a second stage includes $2^{S-2}$ switch modules, ..., and an S-th stage includes one ($2^0$) switch module.

18. An ATM switch according to claim 13, wherein said buffer memory control circuit detects a condition that a cell loss is predicted due to a buffer overflow in a corresponding buffer memory in a switch module, and then sends a read inhibit signal to a corresponding buffer memory control circuit in the preceding stage, the corresponding buffer memory control circuit stops a cell transmission request to the corresponding buffer memory.

19. An ATM switch according to claim 13 wherein said buffer memory control circuit detects a condition that a cell loss has taken place due to a buffer overflow in a corresponding buffer memory in a switch module, and then sends a retransmission signal to a corresponding buffer memory control circuit in the preceding stage, the corresponding buffer memory control circuit supplying a cell retransmission request to the corresponding buffer memory.

20. An ATM switch according to claim 13 said buffer memory of said switch module in the succeeding stage has a cell storage capacity equal to or less than a cell storage capacity of said buffer memory of said switch module in the preceding stage.

21. An ATM switch according to claim 13 said buffer memory of said switch module in the succeeding stage has a cell storage capacity equal to or more than a cell storage capacity of said buffer memory of said switch module in the preceding stage.

22. An ATM multiplexer accommodating K (K is an integer not less than one) input highways and L (L is an integer not less than one) an output highways, comprising a plurality of switch modules coupled to each other in an S-stage structure (S is an integer not less than one),
wherein each of said switch modules comprises:
M inputs (M is an integer not less than one); and
buffer means for multiplexing said M inputs into an output, said buffer means including a buffer memory and a buffer memory control circuit,
wherein said S-th stage structure comprises:
S-stages;
each of said stages except an S-th stage including switch modules, of said plurality of switch modules a number of which is obtained by multiplying by at most M a number of switch modules in a stage subsequent thereto;
said S-th stage, which is a final stage, constituted with one switch module;
each of said stages except said S-th stage having outputs coupled to inputs of a stage subsequent thereto and said S-th stage having an output.

23. An ATM multiplexer according to claim 22 wherein each said switch module comprises:
a multiplexer for multiplexing cells received from said M inputs through a cell interleaving operation;
a buffer memory for storing therein cells produced from said multiplexer; and
a buffer memory control circuit for issuing cell write and read instructions to said buffer memory.

24. An ATM multiplexer according to claim 22 wherein each said switch module comprises:
a buffer memory having M inputs and an output for storing therein cells received from said M inputs; and
a buffer memory control circuit for issuing cell write and read instructions to said buffer memory.

25. An ATM multiplexer according to claim 22 wherein M=2.

26. An ATM multiplexer according to claim 25 wherein in the case of $K=L=2^S$, a first stage includes $2^{S-1}$ switch modules, a second stage includes $2^{S-2}$ switch modules, . . . , and an S-th stage includes one ($2^0$) switch module.

27. An ATM multiplexer according to claim 22, wherein said buffer memory control circuit detects a condition that a cell loss is predicted due to a buffer overflow in a corresponding buffer memory in a switch module, and then sends a read inhibit signal to a corresponding buffer memory control circuit in the preceding stage, the corresponding buffer memory control circuit stops a cell transmission request to the corresponding buffer memory.

28. An ATM multiplexer according to claim 22, wherein said buffer memory control circuit detects a condition that a cell loss has taken place due to a buffer overflow in a corresponding buffer memory in a switch module, and then sends a retransmission signal to a corresponding buffer memory control circuit in the preceding stage, the corresponding buffer memory control circuit supply a cell retransmission request to the corresponding buffer memory.

29. An ATM multiplexer according to claim 22 said buffer memory of said switch module in the succeeding stage has a cell storage capacity equal to or less than a cell storage capacity of said buffer memory of said switch module in the preceding stage.

30. An ATM multiplexer according to claim 22 said buffer memory of said switch module in the succeeding stage has a cell storage capacity equal to or more than a cell storage capacity of said buffer memory of said switch module in the preceding stage.

* * * * *